United States Patent
Ziehr et al.

(12)

(10) Patent No.: US 7,567,864 B2
(45) Date of Patent: Jul. 28, 2009

(54) METHOD FOR CONTROLLING A VEHICLE'S LIGHTING FUNCTIONALITY

(75) Inventors: Lawrence P. Ziehr, Clarkston, MI (US); Nathan Ampunan, Novi, MI (US); Krishnaraj Inbarajan, Troy, MI (US); Mark D. Nemesh, Troy, MI (US); Todd M. Tumas, Taylor, MI (US); Mark R. Willey, Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 534 days.

(21) Appl. No.: 11/312,923

(22) Filed: Dec. 20, 2005

(65) Prior Publication Data

US 2007/0142988 A1    Jun. 21, 2007

(51) Int. Cl.
*B60Q 1/02* (2006.01)
*G06F 19/00* (2006.01)
(52) U.S. Cl. .............................. 701/49; 701/2; 701/208; 315/82; 315/83; 340/468
(58) Field of Classification Search .................. 701/2, 701/49, 1, 29, 35, 36, 207, 213, 208; 315/82, 315/83, 154; 340/426.25, 468, 469; 362/492, 362/487
See application file for complete search history.

(56) References Cited

U.S. PATENT DOCUMENTS

| 6,108,602 | A  | * | 8/2000 | Bairamis | 701/208 |
|---|---|---|---|---|---|
| 6,191,531 | B1 | * | 2/2001 | Reime | 315/82 |
| 6,518,704 | B1 | * | 2/2003 | Schuler | 315/82 |
| 6,900,594 | B1 | * | 5/2005 | Reichert et al. | 315/83 |
| 2003/0186662 | A1 | * | 10/2003 | Himmel et al. | 455/185.1 |
| 2005/0065711 | A1 | * | 3/2005 | Dahlgren et al. | 701/117 |
| 2005/0114007 | A1 | * | 5/2005 | Pillar et al. | 701/82 |
| 2006/0064232 | A1 |   | 3/2006 | Ampunan et al. | |

OTHER PUBLICATIONS

U.S. Appl. No. 11/024,103, filed Dec. 28, 2004, Oesterling et al.

* cited by examiner

*Primary Examiner*—Tan Q Nguyen

(57) ABSTRACT

A method for controlling a vehicle's lighting functionality is disclosed herein. The method may include realizing a preferred vehicle lighting configuration and transmitting a signal to the vehicle via a radio frequency communication system. In response to the signal, the vehicle lighting system may alter a current vehicle lighting configuration to correspond with the preferred vehicle lighting configuration.

15 Claims, 3 Drawing Sheets

METHOD FOR CONTROLLING A VEHICLE'S LIGHTING FUNCTIONALITY

TECHNICAL FIELD

The present disclosure relates generally to vehicles, and more particularly to controlling vehicle lighting functions.

BACKGROUND

Vehicles are often equipped with onboard sensors for determining various environmental conditions surrounding the vehicle. The sensors are generally capable of measuring particular conditions, such as, for example, position and intensity of the sun (relative to the vehicle orientation), ambient light from artificial source(s), temperature, humidity, etc. Once the measurement is taken, the sensor may display the result(s) to the operator, or it may be used to control a vehicle subsystem in an effort to alter a condition in response to the measurement. Sensor measurements may, in some instances, benefit from filtering, via control software, to substantially avoid false readings and/or a rapid system response to short duration events.

As environmental conditions (external to the vehicle) change, or at any time, an operator may desire to alter the vehicle functionality. In some instances, however, the control switch or mechanism of vehicle functionality may not be accessible to the vehicle operator.

Further, vehicles are often equipped with systems and/or subsystems that may be configured according to the operator's preference by manipulating onboard controls, voice-activated controls, and the like. In some instances it may be inconvenient for an operator to adjust the onboard controls. For example, an operator may not be able to read or understand the symbols of the onboard controls or an operator may have a physical limitation that makes it difficult or inconvenient to adjust the onboard controls.

As such, it would be desirable to provide a vehicle system for determining conditions surrounding the vehicle and/or for altering vehicle lighting configuration(s) without the use of onboard sensors.

SUMMARY

A method for controlling a vehicle's lighting functionality is disclosed herein. The method may include realizing a preferred vehicle lighting configuration and transmitting a signal to the vehicle via a radio frequency communication system. In response to the signal, the vehicle lighting system may alter a current vehicle lighting configuration to correspond with the preferred vehicle lighting configuration.

BRIEF DESCRIPTION OF THE DRAWINGS

Features and advantages of the present disclosure will become apparent by reference to the following detailed description and drawings, in which.

DETAILED DESCRIPTION OF THE EMBODIMENTS

Embodiment(s) of the system and method disclosed herein advantageously allow a user/operator to effectively utilize location detection system(s) operatively connected to the vehicle and/or a vehicle communication system to alter vehicle lighting system configurations and/or to determine internal or external vehicle environmental conditions. Rather than relying on complex and/or multiple sensors, embodiment(s) disclosed herein may allow the location detection system to provide information to the vehicle, upon analysis of which, the vehicle may alter the vehicle's lighting configuration. This embodiment may be used either as a stand-alone system, or in conjunction with the vehicle communication system. As such, a non-limitative advantage of embodiment(s) disclosed herein is that onboard vehicle sensors capable of determining the environmental conditions surrounding the vehicle may be substantially obviated, simplified, and/or eliminated, thereby reducing vehicle costs.

It is to be understood that, as defined herein, a user may include vehicle operators and/or passengers.

Figure 1:
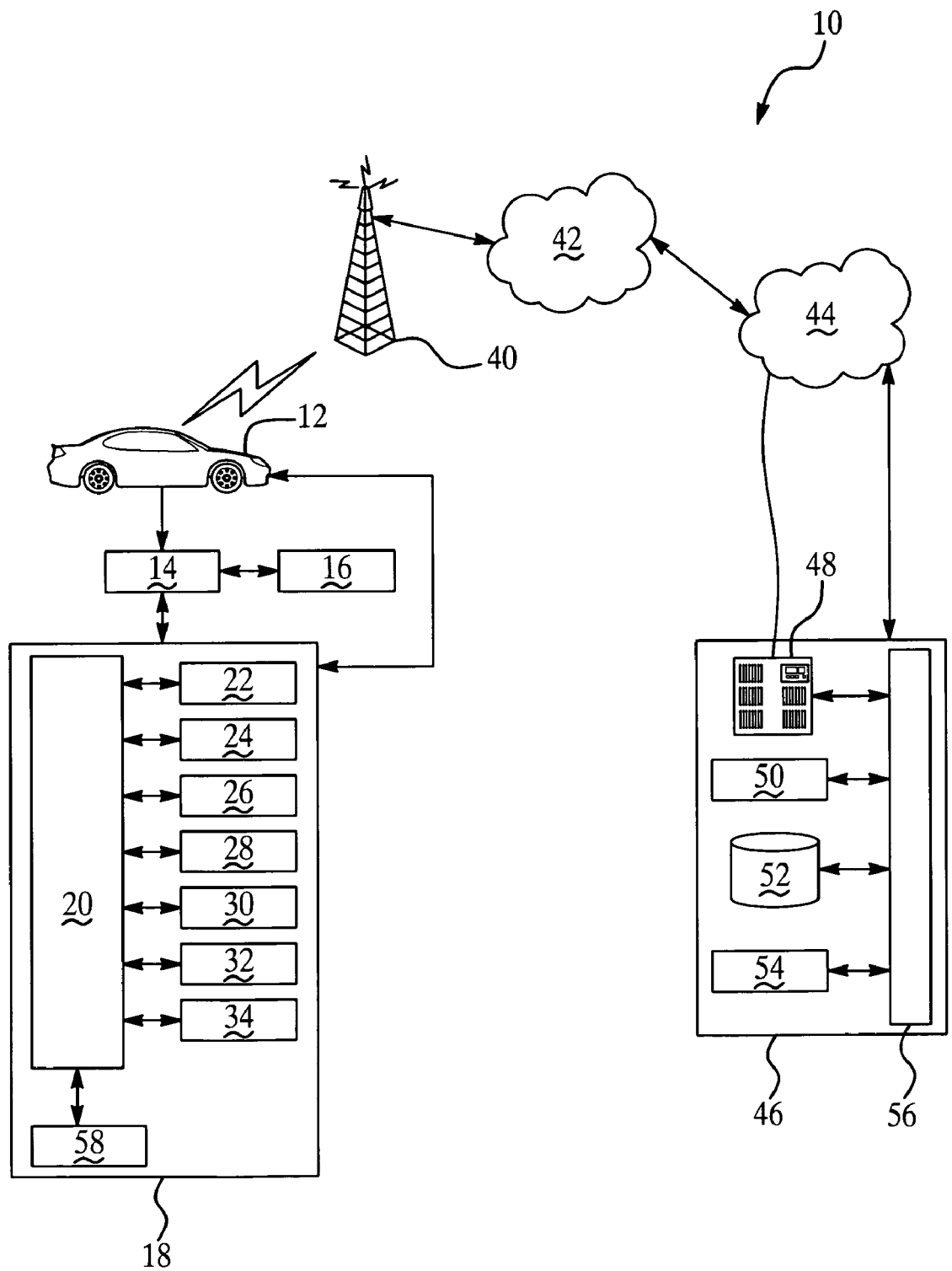
FIG. 1 is schematic diagram depicting an embodiment of a communication system.

Referring now to FIG. 1, the system 10 may include a vehicle 12, a vehicle communications network 14, a telematics unit 18, a radio frequency communication system (including, but not limited to, one or more wireless carrier systems 40, one or more communication networks 42, and/or one or more land networks 44), and one or more call centers 46. In one embodiment, vehicle 12 is a mobile vehicle with suitable hardware and software for transmitting and receiving voice and data communications. System 10 may include additional components suitable for use in telematics unit 18.

In an embodiment, via vehicle communications network 14, the vehicle 12 sends signals from the telematics unit 18 to various units of equipment and systems 16 within the vehicle 12 to perform various functions, such as adjusting headlamp or interior lighting functionality and/or the like. In facilitating interaction among the various communications and electronic modules, vehicle communications network 14 utilizes interfaces such as controller area network (CAN), ISO standard 11989 for high speed applications, ISO standard 11519 for lower speed applications, and Society of Automotive Engineers (SAE) standard J1850 for high speed and lower speed applications.

The telematics unit 18 may send and receive radio transmissions from wireless carrier system 40. In an embodiment, wireless carrier system 40 may be a cellular telephone system and/or any other suitable system for transmitting signals between the vehicle 12 and communications network 42. Further, the wireless carrier system 40 may include a cellular communication transceiver, a satellite communications transceiver, a wireless computer network transceiver (a non-limitative example of which includes a Wide Area Network (WAN) transceiver), and/or combinations thereof.

Telematics unit 18 may include a processor 20 operatively coupled to a wireless modem 22, a location detection system 24 (a non-limitative example of which is a global positioning system (GPS)), an in-vehicle memory 26, a microphone 28, one or more speakers 30, an embedded or in-vehicle mobile phone 32, and/or a real time clock 34.

It is to be understood that the telematics unit 18 may be implemented without one or more of the above listed components, for example speaker(s) 30. Yet further, it is to be understood that the speaker 30 may be a component of the vehicle audio system, which may accept audio and other signals from the telematics unit 18. Telematics unit 18 may include additional components and functionality as desired for a particular end use.

The location detection system 24 may be in operative communication with the vehicle 12 and/or one or more vehicle systems 16 (a non-limitative example of which is a vehicle lighting system). The location detection system 24 may transmit and/or receive information without a request from the user. In one embodiment, the location detection system 24 is a one-way radio frequency communication system. As briefly alluded to above, it is to be understood that the location detection system 24 may be included within the telematics unit 18, may be in communication with the telematics unit 18, or may be a stand-alone system. It is to be understood that the radio frequency communication system (e.g. 40, 42, 44) may include location detection system 24. It is to be further understood that, if location detection system 24 is a stand-alone system, it may be in operative communication with the vehicle 12 or the vehicle system 16, but not part of, or in communication with optional telematics unit 18.

The vehicle lighting system may be in operative communication with telematics unit 18 and/or the location detection system 24.

Non-limitative examples of the location detection system 24 include a Global Position System and/or receiver, a radio triangulation system, a dead reckoning position system, and/or combinations thereof. In particular, a GPS provides latitude and longitude coordinates of the vehicle 12 responsive to a GPS broadcast signal received from a GPS satellite constellation (not shown), date and time of day, etc. It is to be understood that even if the location detection system 24 is not a GPS device, it may be in communication with a global positioning system.

In-vehicle mobile phone 32 may be a cellular type phone, such as, for example an analog, digital, dual-mode, dual-band, multi-mode and/or multi-band cellular phone.

Processor 20 may be a micro controller, a controller, a microprocessor, a host processor, and/or a vehicle communications processor. In another embodiment, processor 20 may be an application specific integrated circuit (ASIC). Alternatively, processor 20 may be a processor working in conjunction with a central processing unit (CPU) performing the function of a general-purpose processor.

Associated with processor 20 is real time clock (RTC) 34 providing accurate date and time information to the telematics unit hardware and software components that may require date and time information. In one embodiment, date and time information may be requested from the RTC 34 by other telematics unit components. In other embodiments, the RTC 34 may provide date and time information periodically, such as, for example, every ten milliseconds.

Further, processor 20 may generate and accept digital signals transmitted between the telematics unit 18 and the vehicle communication network 14, which is connected to various electronic modules in the vehicle 12. In one embodiment, these digital signals activate the programming mode and operation modes within the electronic modules, as well as provide for data transfer between the electronic modules.

It is to be understood that software 58 may be associated with processor 20 for monitoring and/or recording the incoming caller utterances.

Figure 2:
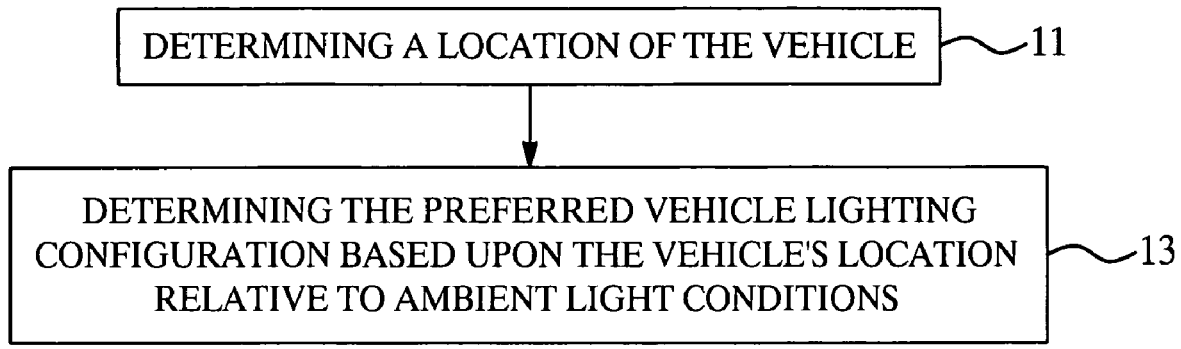
FIG. 2 is a flow diagram depicting an embodiment of a method for realizing a preferred vehicle lighting configuration.

Referring to FIG. 2, an embodiment of the method for realizing a preferred vehicle lighting configuration is depicted. The embodiment generally includes determining a location of the vehicle via a location detection system 24 in communication with the vehicle 12, as depicted at reference numeral 11, and determining the preferred vehicle lighting configuration based upon recognition and analysis of the vehicle's location relative to ambient light conditions, as depicted at reference numeral 13. As a non-limitative example, the location of the vehicle may be determined via a GPS device operatively disposed within the vehicle whereby the location data, in combination with data indicating the ambient light conditions, is used to determine the preferred vehicle lighting configuration.

Figure 3:
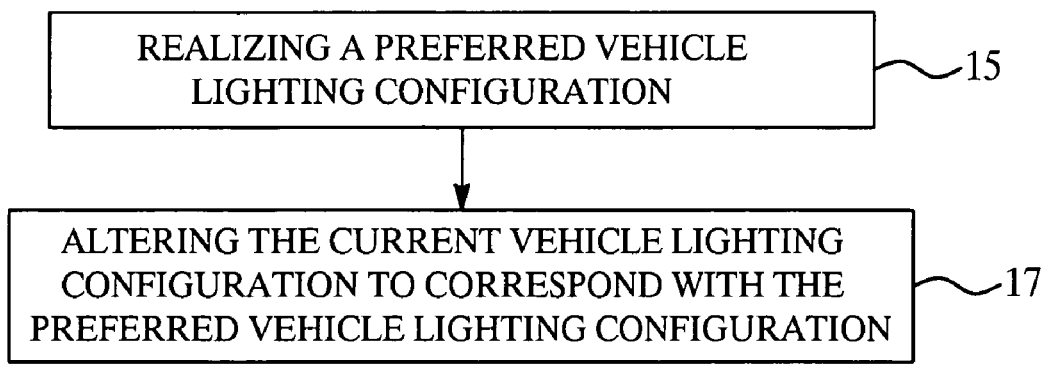
FIG. 3 is a flow diagram depicting an embodiment of a method for controlling a vehicle's lighting functionality.

Referring now to FIG. 3, an embodiment of the method for controlling a vehicle's lighting functionality generally includes realizing a preferred vehicle lighting configuration, as depicted at reference numeral 15, and altering the current vehicle lighting configuration to correspond with the preferred vehicle lighting configuration, as depicted at reference numeral 17.

Figure 4:
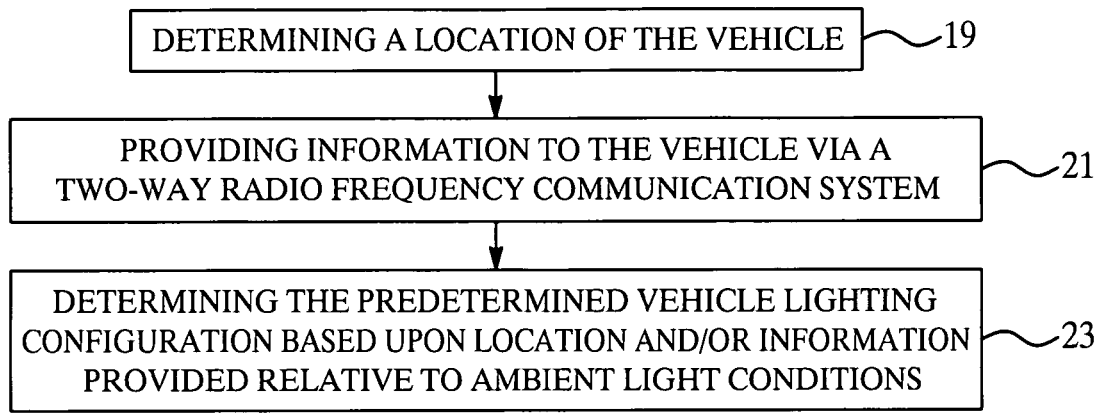
FIG. 4 is a flow diagram depicting an alternate embodiment of a method for realizing a preferred vehicle lighting condition.
Figure 5:
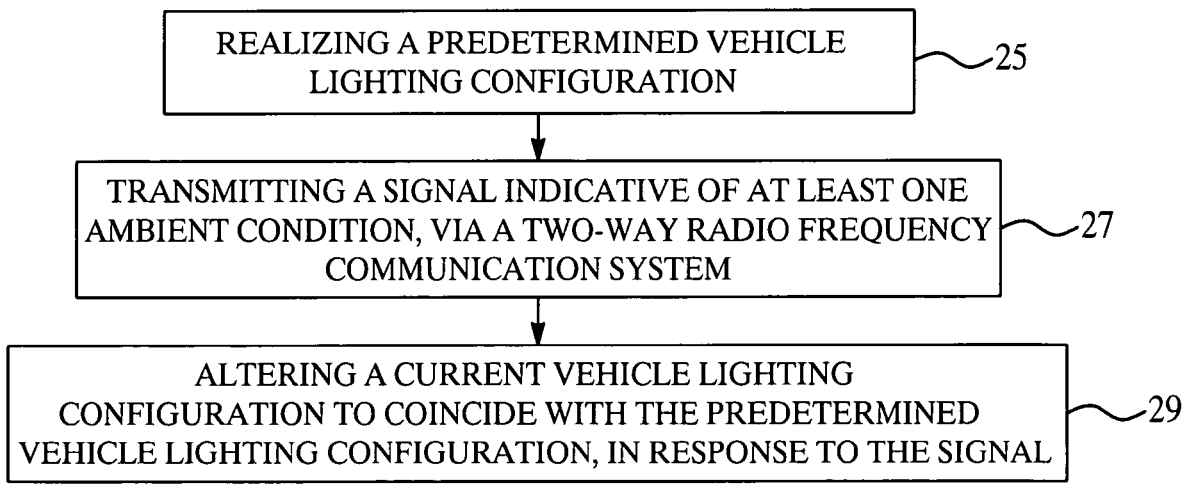
FIG. 5 is a flow diagram depicting an alternate embodiment of a method for controlling a vehicle lighting system.

Referring generally to FIGS. 4 and 5, in an alternate embodiment, a signal, which may be indicative of the vehicle's location, is generated at the call center 46 via an electronic signal generator. The signal may be sent from the call center 46 to the telematics unit 18. The telematics unit 18 then may communicate a command, which corresponds to the signal, to vehicle system 16, such as the vehicle lighting system. The vehicle lighting system may then alter the vehicle lighting configuration to correspond with a preferred vehicle lighting configuration.

Upon receiving the signal, the telematics unit 18 may communicate with vehicle system 16, such as the vehicle lighting system, wherein in response to the signal, the vehicle lighting system is capable of altering the then-current vehicle lighting system configuration to correspond with the preferred vehicle lighting configuration.

It is to be understood that the preferred vehicle lighting configuration may include an internal vehicle lighting configuration (non-limitative examples of which include instrument panel lighting, passenger compartment lighting, and/or the like) and/or an external vehicle lighting configuration.

The preferred vehicle lighting configuration may be selected from ON and OFF.

In a non-limitative example of an embodiment, the preferred vehicle lighting configuration includes a vehicle headlamp configuration, some example embodiments of which include day/night settings, daytime running lamp settings, fog light settings, bright light settings, and the like.

The preferred vehicle lighting configuration may be a function of at least one condition ambient to the vehicle 12. The condition(s) ambient to the vehicle 12 may be selected from vehicle location, the then-current time of day, weather ambient to the vehicle 12, light ambient to the vehicle 12, and combinations thereof. Vehicle location information may be used in conjunction with other current information to realize, for example, the then-current ambient weather conditions. Furthermore, vehicle location may be used in conjunction with time of day information and/or ambient weather information to determine whether the vehicle 12 is currently in light or dark conditions.

Additionally, location data may also be used to determine whether the vehicle 12 is inside a tunnel, parking garage, or other like structure. This information may be communicated to the vehicle lighting system, which, in turn, may optimize the vehicle lighting functionality for the current conditions.

It is to be understood that embodiment(s) of the present disclosure may replace or supplement current on-board vehicle day/night sensors, solar sensors, and/or the like.

In another embodiment using GPS as the location detection system 24, two or more satellites transmit a signal(s), indicative of the vehicle's location, to the vehicle 12 via a one-way radio frequency communication system, which is received via a global positioning system receiver located on-board the vehicle 12. Upon recognition and analysis of the signal, the vehicle lighting system alters the current vehicle lighting configuration to correspond with the preferred vehicle lighting configuration.

The communications network 42 may include services from one or more mobile telephone switching offices and/or wireless networks. Communications network 42 connects wireless carrier system 40 to land network 44. It is to be understood that the communications network 42 may be any suitable system or collection of systems for connecting the wireless carrier system 40 to the vehicle 12 and the land network 44.

The land network 44 connects the communications network 40 to the call center 46. In one embodiment, land network 44 is a public switched telephone network (PSTN). In another embodiment, land network 44 is an Internet Protocol (IP) network. In still other embodiments, land network 44 is a wired network, an optical network, a fiber network, another wireless network, and/or any combinations thereof. The land network 44 may be connected to one or more landline telephones and/or to one or more mobile phones. It is to be understood that the communications network 42 and the land network 44 connect the wireless carrier system 40 to the call center 46.

Call center 46 may contain one or more data switches, one or more communication services managers 50, one or more communication services databases 52 containing subscriber profile records and/or subscriber information, one or more communication services advisors 54, and/or one or more network systems 56.

The switch 48 of the call center 46 connects to land network 44. Switch 48 transmits voice or data transmissions from call center 46, and may receive voice or data transmissions from telematics unit 18 in vehicle 12 through wireless carrier system 40, communications network 42, and land network 44. The switch 48 also receives data transmissions from, or sends data transmissions to one or more communication service managers 50 via one or more network systems 56.

The processor 20 may execute various computer programs that interact with operational modes of electronic and mechanical systems 16 within the vehicle 12. It is to be understood that processor 20 may control communication (e.g. call signals) between telematics unit 18, wireless carrier system 40, and call center 46, when applicable.

Call center 46 may contain one or more service advisors 54. In one embodiment, service advisor 54 may be human. In another embodiment, service advisor 54 may be an automaton.

It is to be understood that an operator/user may initiate a call or a request for information, non-limitative examples of which are a preferred system configuration or information regarding conditions within and/or external to the vehicle 12, via an input system. In such an embodiment, the input system is in communication with a two-way radio frequency communication system. Initiation of the request may be verbal and/or via a physical motion. As such, the input system may include an alphanumeric keypad, a microphone 28, a menu selection system, and/or combinations thereof. The request may be transmitted to the telematics unit 18 and ultimately to the call center 46.

In an alternate embodiment, the information provider (e.g. call center 46) may update information (non-limitative examples of which include information that the user may otherwise frequently request) without a request from the user.

Verbal communication may take place via microphone 28 coupled to the in-vehicle or mobile phone 32 associated with the telematics unit 18. Caller utterances into the microphone 28 are received at the call center 46, which tokenizes the utterance stream for further processing. In one embodiment, the tokenized utterances are placed in a subscriber information database 52 at the call center 46.

Physically initiating the request may be accomplished via a button press, touch screen, or the like located in the vehicle 12. It is to be understood that the button press or touch screen is operatively connected to the telematics unit 18. Upon the user's initiation of the button press or touch screen, the telematics unit 18 signals the call center 46 of the fact that the user has initiated a request. In an alternate embodiment, physically initiating the request may be accomplished via the Internet from a remote electronic device (i.e. a device not in communication with the vehicle 12) that is capable of communicating with the call center 46.

Referring now more specifically to FIG. 4, an embodiment of a method for realizing a preferred vehicle lighting condition is depicted. Generally, the method includes determining a location of the vehicle 12 via a location detection system 24 in operative communication with the vehicle, as depicted at reference numeral 19; providing information to the vehicle 12 via a two-way radio frequency communication system, the information being indicative of one or more conditions ambient to the vehicle, as depicted at reference numeral 21; and determining the predetermined vehicle lighting configuration based upon recognition and analysis of at least one of the vehicle location relative to ambient light conditions and/or the information provided, as depicted at reference numeral 23.

In a non-limitative example, the information is provided in the form of a signal, a display, audio prompt(s), and/or combinations thereof. It is believed that this method may obviate or simplify onboard vehicle sensors capable of determining the one or more conditions.

In another non-limitative embodiment, the predetermined vehicle lighting condition is selected from ON and OFF. In this example, condition(s) ambient to the vehicle 12 may be determined based upon the location of the vehicle 12, and, in response to the condition(s) ambient to the vehicle 12, vehicle headlamps and/or interior lighting are turned ON or OFF.

It is to be understood that vehicle system 16 may be operatively connected to the telematics unit 18 and the radio frequency communication system such that the vehicle system 16 may initiate the request. While the vehicle system 16 generally does not initiate the request in the same manner as an operator, the system 16 may be configured to signal the call center 46 (e.g. information provider).

Upon receiving the request for information or upon determining that it is time to update information, the call center 46 (i.e. the information provider) may either prompt the user for his/her location, or alternately, may locate the vehicle's current position via the location detection system 24.

Once the information provider (i.e. call center 46) locates the vehicle 12, the provider is able to generate the information. It is to be understood that the information may be transmitted to the vehicle 12 via the communication system. The telematics unit 18 within the vehicle 12 is capable of receiving the information after it is downloaded through the land network 44, the communications network 42, the wireless carrier system 40, and the vehicle communications network 14.

It is to be understood that the call center 46 and/or the telematics unit 18 may determine whether altering the vehicle lighting configuration is desirable, taking into consideration the interior vehicle lighting conditions and/or the external vehicle lighting. If the system 10 determines the predetermined function is desirable, the vehicle system 16, such as the vehicle lighting system, may alter the vehicle lighting configuration in response to the command. Alternately, the vehicle lighting function may be presented to the operator via a two-way communication system, and the operator may determine if the vehicle lighting configuration should be altered.

In another embodiment, the information transmitted to the vehicle 12 may be displayed on an electronic display device that is in communication with the radio frequency communication system. Non-limitative examples of the display device include a multi-function display (MFD), an LCD display, a driver information center display, a radio display, an arbitrary text device, and/or combinations thereof.

In another non-limitative example, the call center 46 (or other suitable information provider) may automatically detect the external or internal conditions of the vehicle 12 periodically. For example, the call center 46 may check the ambient light conditions (i.e. natural and/or artificial sources of light) at predetermined time intervals, for example about every 30 minutes, when the vehicle 12 is in operation. It is to be understood that if the call center 46 detects that the ambient light conditions surrounding the vehicle 12 are dark enough for headlight operation, the call center 46 may signal the telematics unit 18, which in turn commands the predetermined vehicle system 16 to operate the headlights, if the operator has not done so manually.

Referring now more specifically to FIG. 5, an embodiment of the method for controlling a vehicle lighting system is depicted. This embodiment generally includes realizing a predetermined vehicle lighting configuration, as depicted at reference numeral 25; transmitting a signal to the vehicle 12 via a two-way radio frequency communication system, the signal being indicative of at least one condition ambient to the vehicle 12, as depicted at reference numeral 27; and altering a current vehicle lighting configuration to coincide with the predetermined vehicle lighting configuration based upon recognition and analysis of the condition(s) ambient to the vehicle 12, as depicted at reference numeral 29.

It is to be understood that the radio frequency communication system may include a global positioning system, which transmits a signal to a global positioning system receiver, which is in communication with the vehicle 12 and/or the vehicle lighting system. In a non-limitative example, the location detection system 24 may transmit a signal, indicative of the vehicle's location, to the vehicle 12 at predetermined intervals during vehicle operation.

It is to be understood that the previously described methods may be incorporated such that upon receiving information indicative of the inside and/or surrounding vehicle condition(s), an operator may determine his or her preferred configuration(s) and then request that the current system configuration(s) be altered to the preferred configuration(s). In a non-limitative example, the call center 46 may periodically check the light ambient to the vehicle 12. Upon being alerted of the amount of light ambient to the vehicle 12, the user may request that the vehicle headlamps and/or interior vehicle lights be adjusted to the user's preferred level. The call center 46 signals the telematics unit 18, which commands the vehicle lighting system to adjust the then-current vehicle lighting configuration to correspond with the user's preferred vehicle lighting configuration.

As used herein, it is to be understood that the terms "preferred" and "predetermined" are to be interpreted interchangeably. As non-limitative examples, they may refer to a configuration that is desirable to a vehicle user, operator, and/or passenger, other vehicle users, operators, and/or passengers. In other non-limitative examples, the term(s) may refer to configurations that are identified as increasing visibility, vehicle detection, and the like.

While several embodiments have been described in detail, it will be apparent to those skilled in the art that the disclosed embodiments may be modified. Therefore, the foregoing description is to be considered exemplary rather than limiting.

The invention claimed is:

1. A method for realizing a preferred vehicle lighting configuration, the method comprising:

determining a location of a vehicle via a location detection system in communication with the vehicle; and determining the preferred vehicle lighting configuration based upon a vehicle user's preferred configuration and upon recognition and analysis of the vehicle's location relative to ambient light conditions.

2. The method as defined in claim 1 wherein the location detection system comprises a radio frequency communication system.

3. The method as defined in claim 2 wherein the location detection system is a global positioning system.

4. The method as defined in claim 1 wherein the preferred vehicle lighting configuration includes at least one of an internal vehicle lighting configuration or an external vehicle lighting configuration.

5. The method as defined in claim 1 wherein the preferred vehicle lighting configuration includes vehicle headlamp configuration.

6. The method as defined in claim 1 wherein the preferred vehicle lighting condition is selected from ON and OFF.

7. The method as defined in claim 1 wherein the location detection system transmits a signal indicative of the location of the vehicle upon a request from a vehicle user.

8. A method of controlling a vehicle lighting system, the method comprising:

determining a location of a vehicle via a location detection system in operative communication with the vehicle;

transmitting information to the vehicle via a radio frequency communication system, the information being indicative of at least one condition ambient to the vehicle;

in response to the information, requesting a user preferred vehicle lighting configuration; and altering a current vehicle lighting configuration to coincide with the user preferred vehicle lighting configuration.

9. The method as defined in claim 8 wherein the information is transmitted to the vehicle by a call center.

10. The method as defined in claim 8 wherein the information is provided in a form selected from a signal, a display, an audio prompt, and combinations thereof 11. The method as defined in claim 8 wherein the at least one condition ambient to the vehicle is selected from vehicle location, time of day, weather ambient to the vehicle, light ambient to the vehicle, and combinations thereof 12. The method as defined in claim 8 wherein the location detection system is a global positioning system.

13. The method as defined in claim 8 wherein the radio frequency communication system is a two-way radio frequency communication system in communication with a call center.

14. The method as defined in claim 13 wherein the two-way radio frequency communication system transmits the information to the vehicle at predetermined intervals during vehicle operation.

15. The method as defined in claim 13 wherein the two-way radio frequency communication system transmits the information to the vehicle in response to a request for the information from a user.

* * * * *